United States Patent [19]

Blickenstaff

[11] 4,167,008
[45] Sep. 4, 1979

[54] FLUID BED CHAFF DISPENSER

[75] Inventor: John E. Blickenstaff, North Tonawanda, N.Y.

[73] Assignee: Calspan Corporation, Buffalo, N.Y.

[21] Appl. No.: 726,037

[22] Filed: Sep. 23, 1976

[51] Int. Cl.² .............................................. H04K 3/00
[52] U.S. Cl. .................................. 343/18 E; 239/171; 222/630
[58] Field of Search .......................... 222/1, 193, 195; 302/53, 54; 102/89, 63; 343/18 E, 18 B; 244/136; 239/171

[56] References Cited

U.S. PATENT DOCUMENTS

| 3,305,142 | 2/1967 | Caldwell | 302/53 |
| 3,429,507 | 2/1969 | Jones | 239/171 |
| 3,432,208 | 3/1969 | Hill et al. | 302/53 |
| 3,808,595 | 4/1974 | Coop et al. | 343/18 B |
| 3,901,184 | 8/1975 | Payne et al. | 222/193 |
| 3,987,966 | 10/1976 | Ruda et al. | 239/171 |

FOREIGN PATENT DOCUMENTS 2201119 7/1973 Fed. Rep. of Germany ............. 302/53
1130633 2/1957 France ...................................... 222/193

Primary Examiner—Robert B. Reeves
Assistant Examiner—H. Grant Skaggs
Attorney, Agent, or Firm—Allen J. Jaffe; David J. Zobkiw

[57] ABSTRACT

The dispensing of the chaff fibers takes place in two distinct steps. Initially, a mixture of chaff and fluidization media is delivered to a fluidization chamber. Bleed air from the jet engines is caused to flow through the mixture of chaff and fluidization media to thereby cause the chaff fibers to churn and become separated in the fluidization chamber. Valves located at the ends of the fluidization chamber open in response to pilot or on-board ECM system activation to dispense the pre-separated chaff fibers.

4 Claims, 5 Drawing Figures

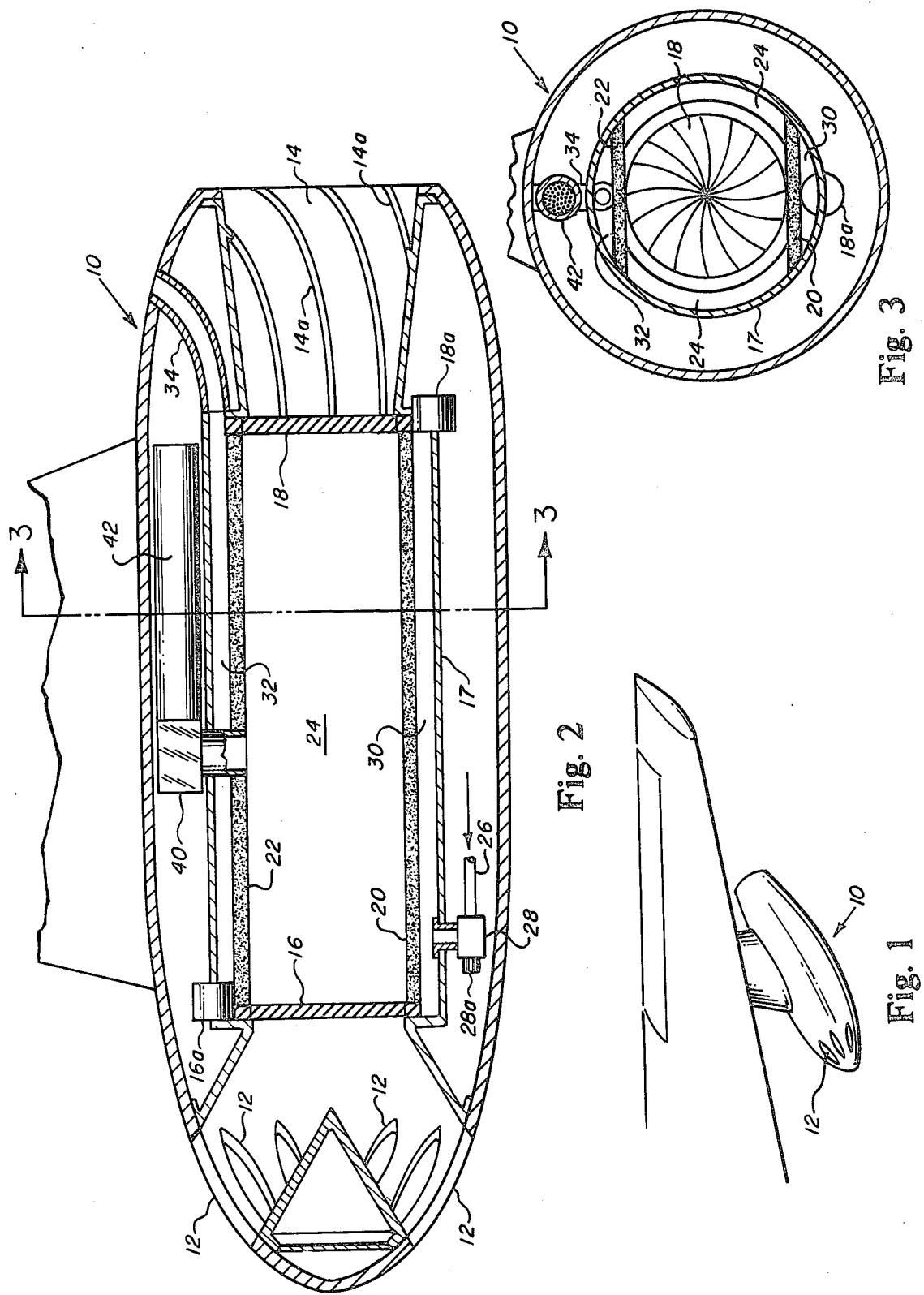

FLUID BED CHAFF DISPENSER

Currently employed chaff dispensers store the chaff fibers in small packages or between layers of plastic. As needed, the chaff is moved via rectilinear mechanical feed devices to a discharge port and is released into the air stream around the carrying aircraft. The chaff fibers are dispensed en masse with no particular control over their spacing. This frequently results in agglomeration "bird nesting" of the chaff fibers and a very low radar cross section. The maximum efficiency of chaff fiber distribution is obtained when the individual chaff fibers are separated from each other by about the length of a fiber.

It is an object of this invention to increase the average space between dispensed chaff fibers.

It is a further object of this invention to provide a method of and apparatus for more efficient chaff dispensing.

It is a still further object of this invention to provide a chaff dispensing system having pre-separation of chaff particles to reduce agglomeration.

It is an additional object of this invention to provide a system for dispensing chaff fibers having more than one length. These objects, and others as will become apparent hereinafter, are accomplished by the present invention.

Basically, the present invention differs from the state-of-the-art devices in that dispensing takes place in two steps. While in the state-of-the-art devices the chaff charge is dispensed from the aircraft and allowed to break up and be distributed downstream of the aircraft, the corresponding step in the present invention is to deliver the chaff charge, together with fluidization media, to a fluidization chamber. Pre-separation of the chaff takes place in the fluidization chamber due to the flow of jet engine bleed air and the fluidization media which cause a churning action of the chaff fibers. When valves leading to and from the fluidization chamber are opened the pre-separated chaff fibers are swept from the fluidization chamber and initially present a continuous radar target with the dispensing airplane.

BRIEF DESCRIPTION OF THE DRAWINGS

For a fuller understanding of the present invention, reference should now be had to the following detailed description thereof taken in conjunction with the accompanying drawings wherein:

FIG. 1 is a perspective view of a chaff dispenser;

FIG. 2 is a sectional view of the chaff dispenser of FIG. 1;

FIG. 3 is a sectional view taken along line 3—3 of FIG. 2;

DESCRIPTION OF THE PREFERRED EMBODIMENTS

Figure 4:
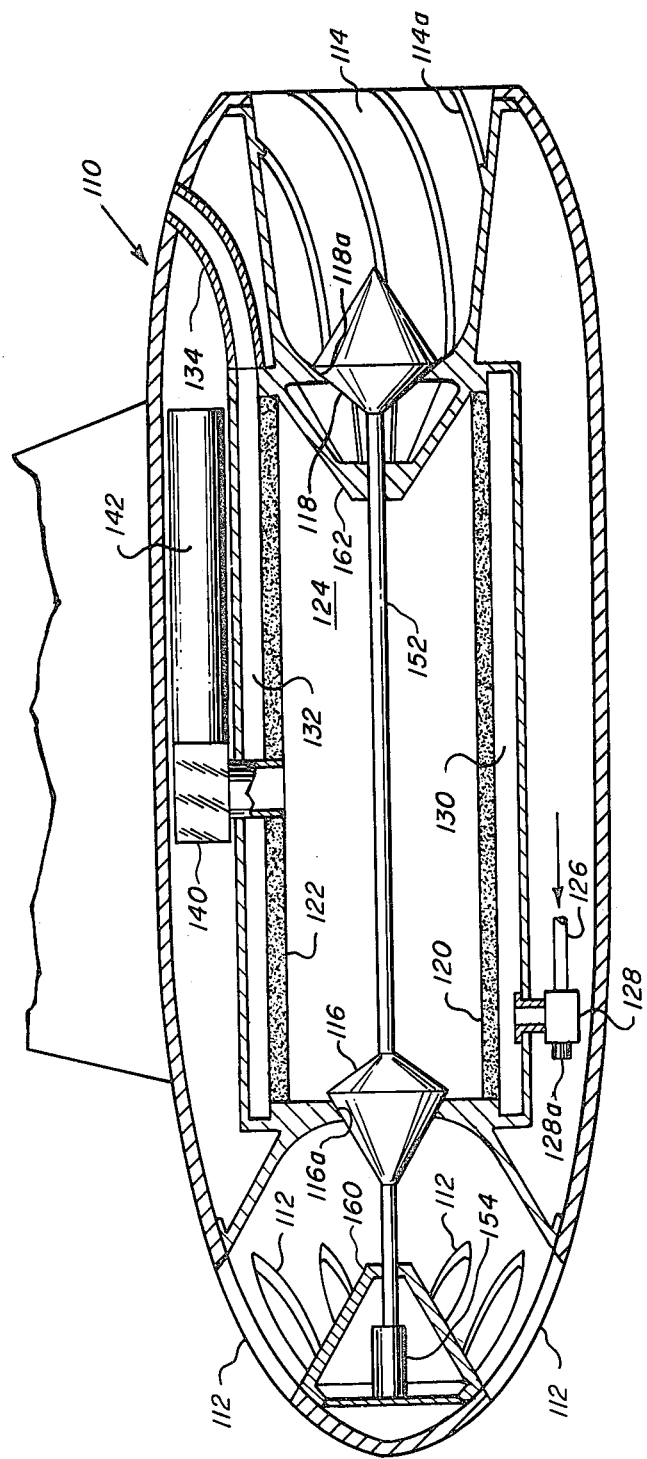
FIG. 4 is a sectional view of a modified chaff dispenser in the closed position.

As shown in FIG. 1, the pod 10, containing the chaff dispenser, is located on the aircraft at a convenient location such as the wing. Referring now to FIGS. 2 and 3, the pod 10 has a main flow path extending from the intake openings 12 to vaned outlet 14. Located in the main flow path are iris valves 16 and 18 which form the respective ends of fluidization chamber 24 defined by inner cylindrical member 17 and porous sintered metal grates 20 and 22. Bleed air from the jet engine is supplied via line 26, containing valve 28, to chamber 30 which is located beneath chamber 24 and is separated therefrom by sintered metal grate 20. Chamber 32, which is located above chamber 24 and is separated therefrom by sintered metal grate 22, is connected via outlet bypass line 34 to the exterior of the pod 10 or with a point downstream of iris valve 18. Chaff feeding mechanism 40 is a state-of-the-art device which feeds prepackaged charges of chaff and fluidization media from chaff supply 42 into fluidization chamber 24 rather than dispensing the chaff into the free stream as in the state-of-the-art systems. Valves 16, 18 and 28 have valve operators 16a, 18a and 28a, respectively, for opening and closing valves 16, 18 and 28.

OPERATION

Valve operators 16a, 18a and 28a and chaff feeding mechanism 40 are actuateable by either the pilot or the onboard ECM system through conventional electrical and/or hydraulic means (not shown). In the ready state chaff feeding mechanism 40 will be activated and a prepackaged charge of chaff and fluidization media will be supplied to fluidization chamber 24 and the packaging broken apart. Ordinarily, in the ready state, valve actuator 28a would be actuated to open valve 28 and establish a flow path between lines 26 and 34 . When valve 28 is open, bleed air from the jet engine passes through line 26 to chamber 30 and upwardly through grate 20 into the fluidization chamber 24. In the fluidization chamber 24 the chaff fibers are subject to a boiling-type of action due to the air flow upwardly through the mixture of chaff fibers and to presence of a fluidization media such as fumed silica. The air flow continues upwardly through grate 22, to chamber 32 and through line 34 to the exterior of the pod 10. In response to pilot actuation or to actuation by the onboard ECM system upon the sensing of a radar scan, iris valves 16 and 18 are opened to permit a free flow of air through the pod 10. This sweeps the charge of chaff fibers from the fluidization chamber 24 into the outlet 14 where vanes 14a cause the chaff fibers to be discharged in a conical pattern. Valves 16 and 18 will be closed and the process repeated. Because the chaff fibers are kept churning and therefore separated, upon release, they initially present a continuous radar target with the airplane. Separation can also be enhanced by coating the chaff fibers with a silane derivative which causes the chaff fibers to repell each other. Also, the chaff fibers may be coated with molybdenum disulfide, $MoS_2$, which fills the surface irregularities in the chaff fibers and thereby prevents their sticking together.

Figure 5:
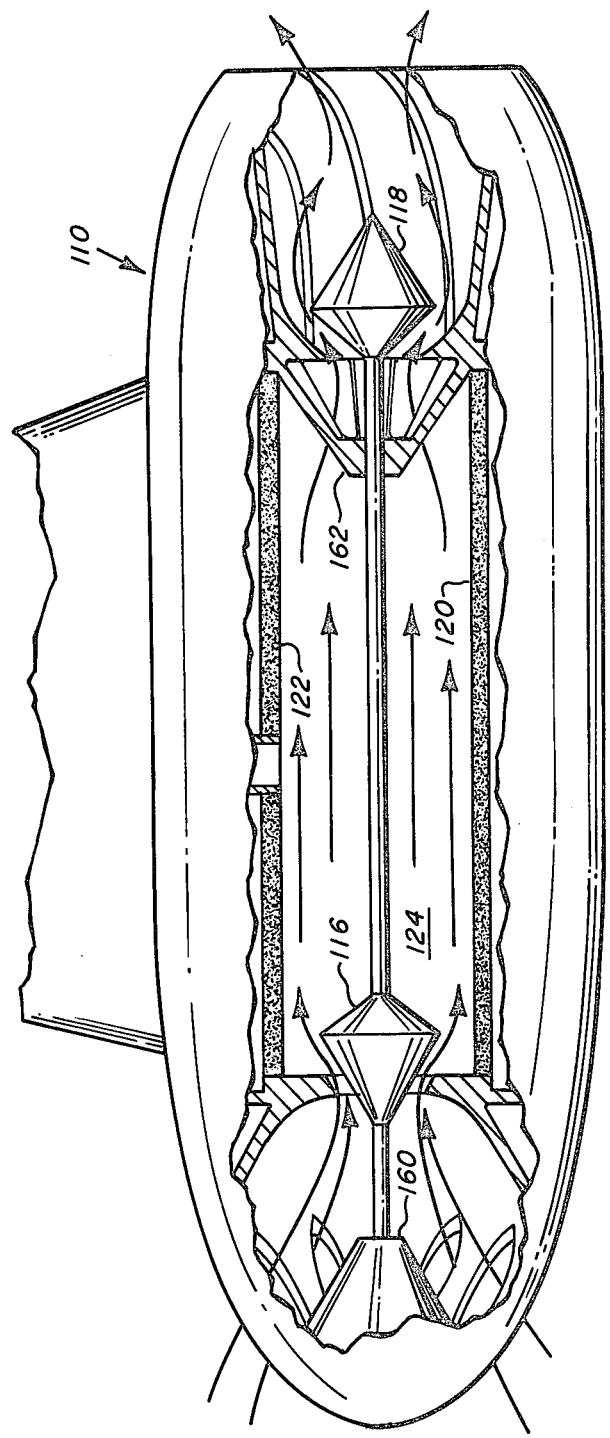
FIG. 5 is a sectional view of the modified chaff dispenser of FIG. 4 in the open position.

The embodiment of FIGS. 4 and 5 is identical to that of FIGS. 1-3 except that the iris valves have been replaced by a piston operated valve mechanism. The pod 110 contains the modified chaff dispenser and has a main flow path extending from intake opening 112 to vaned outlet 114. Located in the main flow path are integral valves 116 and 118 which together with grate defining sintered metal members 120 and 122 define fluidization chamber 124. Valves 116 and 118 seat on valve seats 116a and 118a, respectively, and are connected via valve stem 152 which is integral with the piston (not illustrated) of piston operator 154. The piston operator 154 and valve stem 152 are supported by supports 160 and 162. Line 126 which contains valve 128 supplies jet engine bleed air to chamber 130 which is located beneath chamber 124 and is separated therefrom by sintered metal grate 120. Outlet bypass line 134 connects chamber 132 with the exterior of pod 110 or to a point downstream of valve 118. Chaff feeding mechanism 140 is a state-of-the-art device which feeds prepackaged charges of chaff and fluidization media from chaff supply 142 into fluidization chamber 124 rather than dispensing the chaff into the free stream as in the state-of-the-art systems. Valves 116 and 118 are operated as a unit by piston operator 154. The piston operator 154 is connected to the onboard hydraulic and/or electrical systems for controlling the piston operator as through servo valves in the hydraulic supply line for the piston operator 154 or through the actuation of a pump for supplying pressurized hydraulic fluid to piston operator 154. Valve 128 has valve operator, or servo, 128a for opening and closing valve 128.

OPERATION

Valve operator 128a, piston operator 154 and chaff feeding mechanism 140 are actuateable by either the pilot or the onboard ECM system through conventional electrical and hydraulic means (not shown). In the ready state chaff feeding mechanism 140 will be activated and a prepackaged charge of chaff and fluidization media will be fed into fluidization chamber 124 and the packaging broken apart. Ordinarily, in the ready state, valve actuator 128a would be actuated to open valve 128. When valve 128 is open, bleed air from the jet engine passes through line 126 into chamber 130 and upwardly through grate 120 into the fluidization chamber 124. In the fluidization chamber 124 the chaff fibers are subject to a boiling-type of action due to the air flow through the mixture of chaff fibers and fluidization media. The air flow continues upwardly through grate 122, to chamber 132 and through line 134 to the exterior of pod 110. In response to pilot actuation or to actuation by the onboard ECM system upon the sensing of a radar scan, pressurized fluid supplied to piston operator 154 causes valves 116 and 118 to be moved to the right (as viewed in FIGS. 4 and 5) and thereby opened. A free flow of air can then pass through the pod 110 sweeping the charge of chaff fibers from the fluidization chamber 124 to the outlet 114 where vanes 114a cause the chaff fibers to be discharged in a conical pattern. After a suitable period of time, either automatically or due to pilot actuation, pressurized fluid supplied to piston operator 154 causes valves 116 and 118 to be moved to the left (as viewed in FIGS. 4 and 5) thereby closing valves 116 and 118. The operation of the system may then be repeated.

Although the chaff has been described as prepackaged, the chaff may be in bulk and dispensed in fixed or variable amounts together with the fluidization media. The chaff feeding mechanism and valve actuation structure has not been described in detail since they are conventional and their details do not form a part of the present invention. Outside air may be used in place of the jet engine bleed air, but problems may arise from weather and temperature related conditions. The valve structure defining the respective ends of the fluidization chamber may be of different types, may be mechanically connected for simultaneous operation through a single operator or otherwise modified so long as essentially simultaneous operation and a relatively restriction free flow path is present. Additionally, the fluid bed may be remotely located inboard using duct work to transport the chaff to a more advantageous discharge point. It is therefore intended that the scope of the present invention is to be limited only by the scope of the appended claims.

I claim:
1. A fluid bed chaff dispenser including:
   I. fluidization chamber means;
   II. means for supplying chaff fibers and fluidization media to said fluidization chamber means;
   III. first flow path means including first and second porous means for supplying air to said fluidization chamber means through said first porous means which defines the bottom portion of said fluidization chamber means to cause the churning and separation of any chaff fibers present therein before passing outwardly through said second porous means; and
   IV. second flow path means including normally closed valve means for supplying air to said fluidization chamber means and for sweeping all of the separated chaff fibers therefrom when said valve means are opened.
2. A fluid bed chaff dispenser including:
   I. fluidization chamber means including:
      A. normally closed first valve means located at one end of said chamber means;
      B. normally closed second valve means located at a second end of said chamber means;
      C. first porous means defining the bottom of said chamber means;
      D. second porous means defining the top of said chamber means;
   II. means for supplying chaff fibers and fluidization media to said fluidization chamber means;
   III. first flow path means including said first and second porous means for supplying air to said fluidization chamber means through said first porous means to cause the churning and separation of any chaff fibers present therein before passing outwardly through said second porous means when said first and second valve means are closed; and
   IV. second flow path means including said first and second valve means for supplying air to said fluidization chamber means and for sweeping the separated chaff fibers therefrom when said first and second valve means are opened.
3. A method of dispensing chaff including the steps of:
   supplying dry chaff fibers and a dry fluidization media to a closed fluidization chamber;
   separating the dry chaff fibers within the closed fluidization chamber by passing air into the closed fluidization chamber through the entire area of the bottom of the closed fluidization chamber;
   opening and dispensing the dry, separated chaff fibers from said fluidization chamber.
4. A method of dispensing chaff including the steps of:
   supplying dry chaff fibers and a dry fluidization media to a closed fluidization chamber;
   passing air through the entire area of the bottom of the closed fluidization chamber and out the top of said closed fluidization chamber to cause churning and separation of the dry chaff fibers in said closed fluidization chamber; and
   opening said closed fluidization chamber to permit air to enter said fluidization chamber and to sweep said dry, separated chaff fibers from said fluidization chamber.

* * * * *